US006359584B1

(12) United States Patent
Cordey et al.

(10) Patent No.: US 6,359,584 B1
(45) Date of Patent: Mar. 19, 2002

(54) RADAR FOR SPACE-BORNE USE

(75) Inventors: Ralph A. Cordey, Maldon; Nigel S Wheadon, Witham; Charles D Hall, Havant; Paul I Phelps, Waterlooville, all of (GB)

(73) Assignees: Astrium Limited; Bae Systems Electronics Limited, both of (GB)

( * ) Notice: Subject to any disclaimer, the term of this patent is extended or adjusted under 35 U.S.C. 154(b) by 0 days.

(21) Appl. No.: 09/668,198

(22) Filed: Sep. 22, 2000

(30) Foreign Application Priority Data

Sep. 23, 1999 (GB) ............................................... 9922490

(51) Int. Cl.[7] ................................................. G01S 7/40
(52) U.S. Cl. ........................... 342/169; 342/25; 342/82; 342/165; 342/175; 342/188; 342/195; 342/352; 342/358
(58) Field of Search ........................... 342/25, 89, 102, 342/103, 165, 173–175, 188–197, 362, 378, 82, 159, 352, 358, 169–172

(56) References Cited

U.S. PATENT DOCUMENTS

| | | | |
|---|---|---|---|
| 4,060,808 A | 11/1977 | Foldes | |
| 4,785,302 A | * 11/1988 | Ma et al. | 342/362 |
| 5,068,668 A | * 11/1991 | Tsuda et al. | 342/362 |
| 5,313,210 A | 5/1994 | Gail | |
| 6,208,295 B1 | * 3/2001 | Dogan et al. | 342/378 |

FOREIGN PATENT DOCUMENTS

SU 1835527 A 8/1993

* cited by examiner

Primary Examiner—Bernarr E. Gregory
(74) Attorney, Agent, or Firm—Kirschstein, et al.

(57) ABSTRACT

Faraday Rotation causes rotation of the plane of polarization of plane polarised radiation emitted by a radar e.g. a synthetic aperture radar and, if returns polarized in orthogonal planes are measured at the synthetic aperture radar in order to determine polarimetric characteristics of the ground, which could show up features of the ground such as crop patterns, the measurements made at the SAR are contaminated by the Faraday Rotation. In the invention, the transmitted plane polarized beam is pre-rotated in transmitter 9, the radar returns in receiver 13 are mathematically adjusted in signal formatting 14, 15 to compensate for just the pre-rotated angle, to produce data streams on downlink 16 uncontaminated by the Faraday Rotation. The Faraday Rotation may be estimated by external means 11, 12, or by performing correlation 10 of the orthogonally polarized radar returns to establish a minimum, while the pre-rotation angle and mathematical correction of the returns are being iteratively adjusted, at which Faraday Rotation is assumed to be compensated.

12 Claims, 2 Drawing Sheets

RADAR FOR SPACE-BORNE USE

This invention relates to radar for space-borne use, especially to synthetic aperture radar (SAR).

SARs can be used to generate high resolution images of terrain, taking advantage of the relative velocity between the space-borne SAR and the ground below.

Particular features of the terrain e.g. crop distributions and characteristics can be highlighted by polarimetric SAR imaging. In this, the ground is illuminated by pulses of radiation which is plane polarised, and the energy scattered back towards the radar carries information about any essentially vertical or horizontal nature of the features illuminated. As a very schematic illustration, FIG. 1 shows a polarimetric SAR 1 in orbit around the Earth, emitting pulses 2 of vertically polarised radiation. These are scattered in all directions at the ground, and some are backscattered to the SAR. The scattered radiation, including the backscattered radiation, typically has horizontal as well as vertical components of polarisation.

A problem for such space-borne polarimetric SARs in the presence of the ionosphere 3, shown dotted in FIG. 1. This, in conjunction with the presence of the Earth's magnetic field, causes a rotation of the polarisation of the plane polarised radiation on its path down to Earth, and another rotation on the way back to the SAR. This rotation is termed Faraday Rotation. While this is small for short wavelengths such as C-band (typically, 6 cm wavelength), it becomes sizeable in L-band (typically, 24 cm wavelength), and very large e.g. hundreds of degrees of rotation for P-band (typically 68 cm wavelength).

This causes errors in the interpretation of the information extracted from the SAR data, since if the radiation of the transmitted pulses is vertically polarised on leaving the SAR, the observed values of vertical and horizontal components of the radar returns at the SAR underestimate the true value of that vertical component and overestimate the horizontal component.

One known solution to this problem is to use circularly polarised radiation which is not affected by Faraday Rotation and, while it is popular for this reason in communications applications, it is less suited to the needs of radar remote sensing, because ground features in general possess inherent features that are vertical or horizontal rather than left or right hand helical, in nature.

Another known solution to this problem employs so-called quadrature polarised operation of the radar. Alternate transmitted pulses are vertically and horizontally polarised. The horizontal and vertical component of each radar return at the SAR is measured, and a knowledge of the relative phases and amplitudes of successive pairs of returns provides sufficient information for the amount of Faraday Rotation to be calculated and corrected for.

A simple example may help to illustrate how this is done. FIG. 2 shows a vertically polarised pulse 4 from the SAR impinging on a vertically-extending scattering surface 5 at the ground. At this first order reflection, some of which returns to the SAR, the scattered radiation remains vertically polarised.

Some of this vertically polarised scattered radiation undergoes second order reflection at an obliquely-extending scattering surface 6, which has the effect of producing horizontally and vertically polarised second order reflections. A horizontally polarised second order reflection 7 is illustrated in a direction back towards the SAR.

If the separation between first and second order reflections is random, as might be expected for scattering from any particular region of the Earth, (and assuming here that no Faraday Rotation takes place), the phase of the reflected horizontally polarised pulse 7 will be random relative to the reflected vertically polarised pulse.

It turns out that, in normal circumstances, this relation is generally true for no Faraday Rotation, and is termed azimuth isotropy. In other words, the mean correlation product between vertically and horizontally polarised returns (between co-polarised and cross-polarised returns more generally since this also applies if the incoming pulses are horizontally polarised), is zero.

In quadrature polarised data streams, the existence of four coherently related data streams from the radar corresponding to radiation emitted at the radar, scattered at the Earth's surface and received back at the radar (VV, VH—co-polar and cross-polar returns from vertically polarised pulses, HH, HV—co-polar and cross-polar returns from the alternate horizontally polarised pulses) enable the data streams to be manipulated mathematically to represent data streams corresponding to a de-rotated incoming beam and de-rotated return beam, whose plane of polarisation has been rotated through an angle θ relative to the initial frame of reference.

The set of four channels of received data is operated on successively, on an iterative basis, to determine the rotation angle corresponding to a minimum in correlation between the co-polarised and cross-polarised data streams (corresponding to the example of no Faraday Rotation of FIG. 2). This angle is then identified as the Faraday Rotation angle, and the calculated data streams corresponding to this angle of notional rotation are regarded as corrected data streams in which the contamination due to Faraday Rotation has been removed.

However, operation of a radar in SAR mode places specific SAR related criteria on its operation. Such criteria constrain the following parameters: the pulse repetition frequency (PRF) at which the radar must operate, the relationship between antenna area and the slant range to the region being imaged, incidence angle at which that region is viewed, RF carrier frequency at which the radar operates and orientation of the radar beam to the along track trajectory. A particular feature that fundamentally constrains the access that can be achieved to a given region is the maximum incidence at which acceptable SAR performance can be maintained. If attempts are made to operate the radar beyond this limit, the imagery produced by the system becomes unacceptably contaminated by responses from regions remote from the desired region. These artifacts are called ambiguities.

When the radar operates in the fully polarimetric, quadrature-polar mode with alternating pulses of H and V polar signals being emitted, the constraint on PRF for SAR operation has to be maintained for each sequence of transmissions. Thus the H sequence of transmissions must be at the same PRF as that for the V transmissions. Therefore the overall PRF at which the radar can operate is doubled.

This doubling of PRF in quadrature-polar mode causes the radar system to be more susceptible to ambiguities and further constrains the maximum incidence angle within which successful imaging can be conducted.

The invention provides radar for space-borne use, comprising means for transmitting pulses of radiation which are polarised in one plane, means for receiving radar returns, and means for adjusting the plane of polarisation of the transmitted pulses in dependence upon an estimate of the Faraday Rotation undergone by the plane of polarisation of the pulses.

Actual rather than notional pre-rotation of the plane of polarisation of pulses polarised in one plane, based on an estimate for the Faraday Rotation, enables correction to take place without recourse to doubling the pulse repetition frequency as is necessary if correction employing quadrature polarised data streams is used.

De-rotation of the returns may be performed in a number of ways, for example, in a notional manner by performing mathematical operations on the returns, or in an actual manner, for example, by rotation of the receiving antenna or rotation of its response pattern.

The amount of Faraday Rotation experienced by the propagating wave-front can be estimated in a number of ways.

It may be estimated by calculation from basic parameters if the total electron density within the plasma on the propagation path and the magnitude of the magnetic field present within that plasma are both known parameters. The total electron density may be established by calculation from measurements of the differences in round-trip time between the radar and the ground at different carrier frequencies.

The amount of rotation may alternatively be estimated by prediction from knowledge of the general spatial and temporal behaviour of ionospheric weather conditions.

Alternatively, the amount of rotation may be estimated by extrapolation from intermittent/spot measurements of Faraday Rotation or applicable ionospheric conditions, and predictions of ionospheric weather conditions.

Alternatively, the amount of rotation may be estimated by calculation from on-board observations of intermittent quadrature polar responses from the ground. While this technique is known in its application to quadrature polar data streams, its application as an intermittent measuring technique allowing dual polar observation to be made at significantly greater ranges is new. In other words, intermittent bursts of alternate horizontal and vertically polarised pulses could be emitted, to permit the Faraday Rotation to be calculated, so that the plane of the single plane of polarisation of the transmitted pulses, and those of the returns, could be appropriately adjusted.

As another alternative, the Faraday Rotation could be estimated by calculation from on-board observations of intermittent quadrature polar responses from the ground coupled with predictions of Faraday Rotational behaviour based on predictions of ionospheric weather conditions.

In a preferred embodiment, the means for receiving radar returns is arranged to receive radiation polarised in orthogonal planes, and the Faraday Rotation is estimated by an iterative combination of pre-rotation of the plane of polarisation of the transmitted signal and calculations based real-time analysis of the resulting orthogonal dual polar returns.

The output of each of these techniques is a signal whose magnitude is a measure of the angle through which Faraday Rotation will rotate the plane of polarisation of signals on the outward path and echoes on the return path.

A combination of means for estimating Faraday Rotation may be used to provide a better estimate of Faraday Rotation.

BRIEF DESCRIPTION OF THE DRAWINGS

Ways of carrying out the invention will now be described in greater detail, by way of example, with reference to the accompanying drawings, in which.

DETAILED DESCRIPTION OF THE INVENTION

Figure 1:
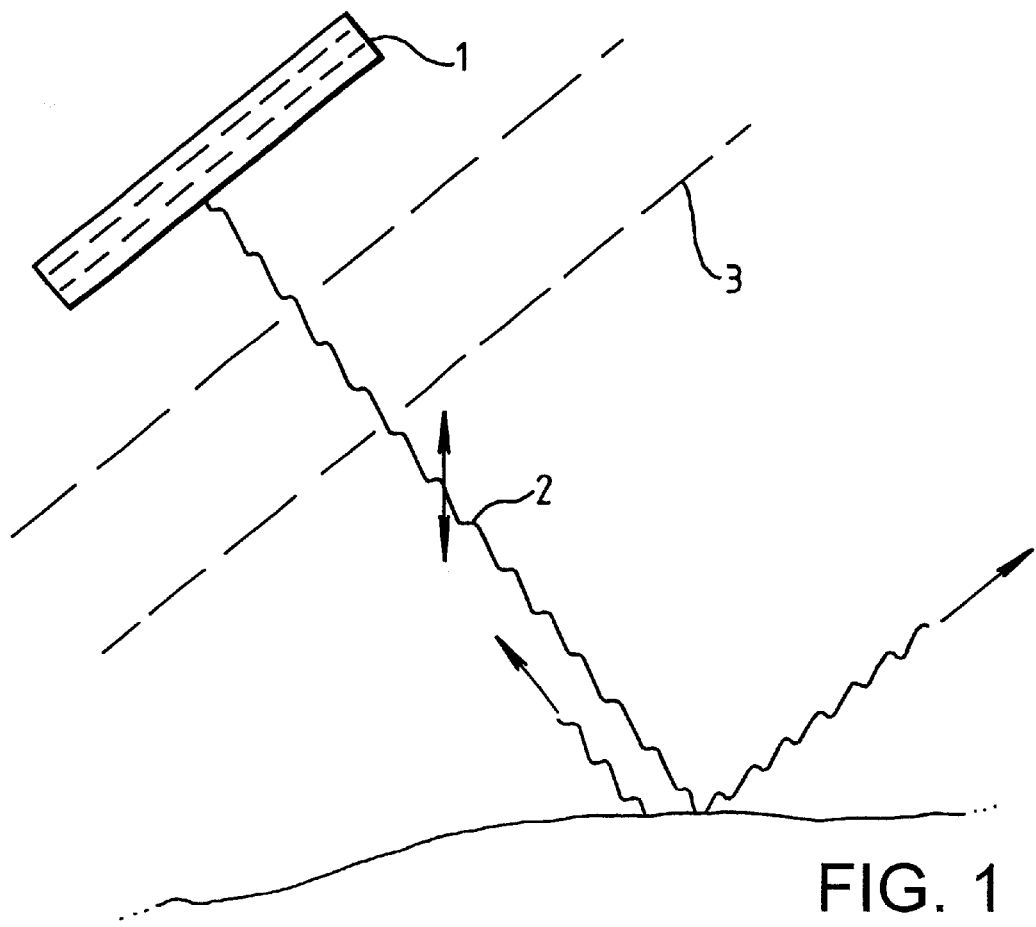
FIG. 1 is a diagrammatic view of a SAR emitting pulses.
Figure 2:
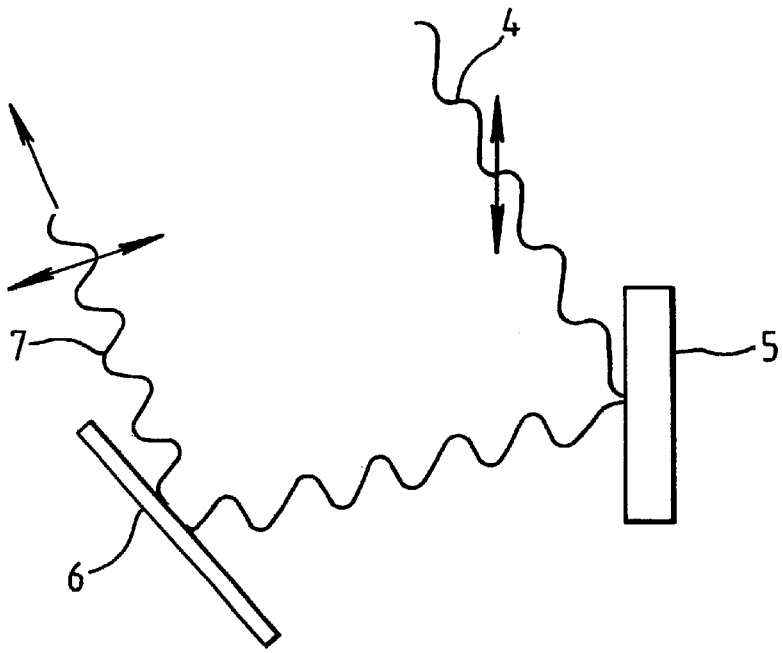
FIG. 2 is a diagrammatic view to illustrate secondary scattering at one obliquely orientated scattering surface.

The SAR is a dual polarised radar i.e. pulses of plane polarised radiation are transmitted, but the returns are collected at the SAR by antennas arranged to receive orthogonally polarised radiation, one plane coincident with that of the transmitted pulses (co-polarised) and the other at right angles to that of the transmitted pulses (cross-polarised). However, it must be realised that the orthogonal planes of the returns can be at any angle to the plane of the transmitted pulses, provided that this angle is known. The cross-polar return is normally weaker by an order or magnitude than the co-polar return.

This method relies for its success on transmitting a series of pulses whose plane of polarisation has been deliberately rotated away from the nominal horizontal/vertical frame of reference by an angle equal to the rotation that will be caused by Faraday Rotation as the signal traverses the ionosphere. The sense of rotation applied to the transmit pulses is such that when the transmit pulses arrive at the Earth's surface, their associated plane of polarisation will be purely vertical or horizontal. This is an important feature of the design because it ensures that at the ground, there will be no contamination of the cross-polar echo stream by residual illumination in that corresponding channel.

Thus, it follows that if for instance illumination at the Earth's surface is intended to be H polarised, then the cross-polar (V polarised) signals scattered from the surface will not be contaminated by co-polar response from any V signal illumination of the surface. Typically, cross-polar reflectivities of the Earth's surface are some only 10 to 20% as strong as the corresponding co-polar reflectivities. Therefore the potential for contamination is high. An analogous argument applies if the illumination is intended to be V polarised.

Assuming that the angle through which the transmit plane will be rotated by Faraday Rotation has been estimated correctly, then the co and cross-polarised echo signals will be rotated through the same angle on the return journey to the radar. On reception at the radar, components of the co and cross signals are gathered simultaneously in the H and V polar channels of the radar, so that the channel contains elements of the co and cross signals, and the V channel also contains (complementary) elements of the same signals.

However, given knowledge of the rotation expected during passage through the ionosphere, the signals received in the radar H and V are mathematically manipulated to account for this expected rotation and provide a data set that corresponds to the pure co and cross polar signals prior to Faraday Rotation. Alternatively, the rotation of received signals could be undertaken by physical means, either by rotation of the receiving antenna, or by rotation of the polarimetric responsiveness of the receiving antenna. (The receiving antenna may be physically the same as the transmitting antenna—and form part of what is called a monostatic radar. Alternatively, the receiving antenna may be physically different from the transmitting antenna—and form part of what is called a bistatic radar).

The statistical properties of the signal stream collected after this mathematical rotation are then tested by forming the mean of the products of many individual pairs of co and cross measurements. This mean value represents the correlation between co and cross channels and should be zero when the rotation angle has been selected appropriately. The detailed mathematical analysis presented hereinafter shows that if the angle is underestimated then the mean value will have the opposite polarity from that when the angle is overestimated. Thus, the analysis shows that the mean value formed as described represents a viable way of monitoring the success with which the Faraday Rotation angle has been selected and provides a viable control signal with which to reselect a new estimate of the angle. In simple terms, the mean value provides the essential control signal for inclusion within a feedback loop to continuously monitor and update the level of Faraday Rotation being experienced.

Thus, the plane of polarisation of the transmitted pulses is adjusted iteratively. This adjustment of the plane of polarisation of the transmitted pulses may be done mechanically i.e. there may be mechanical rotation of the antenna about the bore-sight of the propagating beam. Although some SAR antennas are circular and produce circular beams, most SAR antennas are non-circular and produce beam patterns in angular space that have distinctly non-circular profiles. These profiles are designed to provide particular performance characteristics for the SAR. Mechanical rotation of antennas producing non-circular profiles, reconfigures unacceptably the ground pattern of the antenna and destroys the desired performance characteristic. Therefore, the mechanical rotation approach to pre-rotation of the plane of polarisation has some disadvantages.

Figure 3:
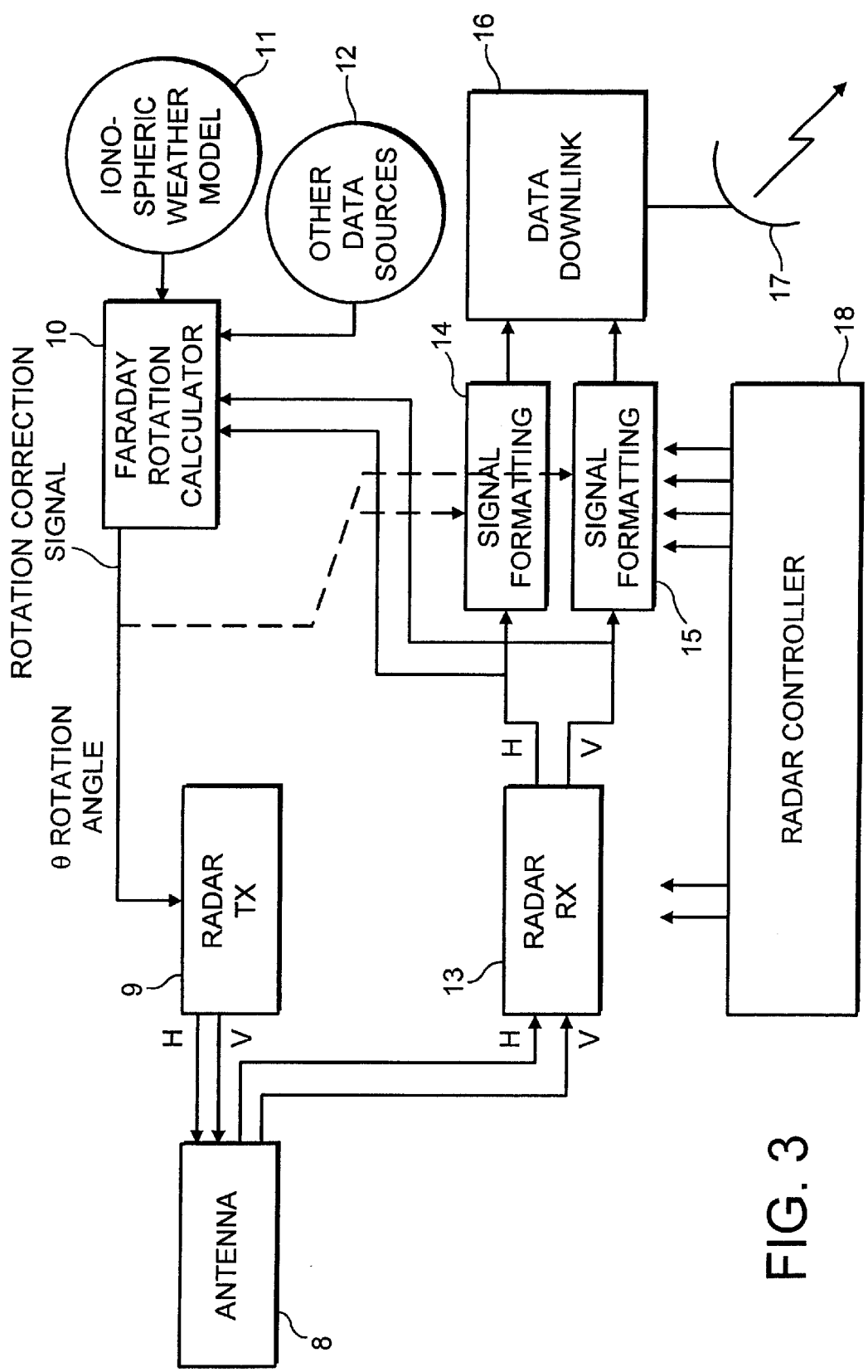
FIG. 3 is a block diagram of one embodiment of a SAR in accordance with the invention.

In the preferred embodiment of FIG. 3, rotation of the plane of polarisation of transmitted pulses is accomplished electrically, by appropriate excitation of the radiating elements. A similar technique can be used to de-rotate the received signals after rotation along the return path as an alternative to mathematical de-rotation.

Antennas can be excited by a feed network operating in association with either reflecting structure or with an array of radiating elements.

In this embodiment, means is provided for simultaneously exciting appropriate levels of H and V radiation from the antenna during transmit functions, and for providing sensitivity in co- and cross-polar (H and V) channels at the antenna during receive functions.

This functionality is achieved as described in the following text.

The antenna 8 is identified as having two ports through which feed takes place. One port provides excitation of one plane of polarisation (say H), while the other provides excitation in the orthogonal plane (say V). It is assumed that the feed network between the feed ports and some reference plane in the far field of the antenna has been so arranged that when a common excitation is applied to both feed ports at the antenna, the H and V radiation fields produced at the reference plane are in phase with each other. This relationship ensures that when signals of different amplitude but equal phase are applied to the feed ports, the radiation leaving the antenna is plane polarised. If phase equality at the feed ports is not maintained then the radiation leaving the antenna would contain an undesired element of circular polarised radiation.

The relative difference between excitation amplitudes is defined to control explicitly the angle of the plane of polarisation of the antenna relative to its nominal H and V axes. Specifically, the relationship between excitation amplitudes $V_H$ and $V_V$ at the H and V ports, and the angle of polarisation $\theta_{rotation}$ is given by;

$$V_H = V_0 \sin(\theta_{rotation})$$
$$V_V = V_0 \cos(\theta_{rotation})$$

Excitations of this form are produced by electrical equipment. If produced separately with one equipment producing the H excitation and another equipment producing the V excitation, the efficiency expressed in terms of raw electrical power converted into radar frequency power, is small but nevertheless can be successfully used to provide the required excitations needed to produce the required rotation of the plane of polarisation.

However, it is possible to produce the required excitations more efficiently with equipments of the general form outlined here;

A single signal modulated with the radar transmit pulse, prior to its amplification to full output power level is routed into transmitter 9 which, in conjunction with the feeds to antenna 8, adjusts the plane of polarisation of the transmitted pulses. In transmitter 9, the stream of pulses is split to provide two streams of the signal, each of magnitude $V_0$, which are then led into two separate modulator elements. Here, the angle estimated in Faraday Rotation Calculator 10, to have been caused by Faraday Rotation, is used to calculate the corresponding values of sine and cosine. These values are then used to modulate the two signal streams. These two modulated signals are then taken to the input ports of 3 dB splitter element(s). Signals at the outputs of these elements are led to power amplifier circuits where the RF power output signals are generated. Outputs from these circuits are then led to additional splitter element(s) at whose outputs, signals intended for the antenna H and V ports of antenna 8 appear.

This arrangement for RF amplification including splitters before and after the amplification process allows both channels of amplification to be operated at optimum efficiency, while ensuring that appropriate signals arrive at the antenna feed ports.

The Faraday Rotation Calculator may have an input from optional ionospheric weather information 11, or from other information 12, or, as preferred may be iteratively calculated as described hereinafter.

The radar receiver 13 receives two streams of dual polarised signals (using the same or different antenna) which are corrected mathematically for Faraday Rotation in signal formatting units 14, 15 with the instantaneous correction provided.

Then in Faraday Rotation Calculator 10, the mean of the product of may pairs of co and cross measurements are made.

The instantaneous angle of pre-rotation is adjusted and the mean is recalculated. This process is performed on a continuous basis to find the minimum of the mean, at which the data output to data down transmitter 16 (and antenna 17) is corrected so that the effects of Faraday Rotation are removed from the streams of dual polar returns. All operations take place under the control of controller 18.

The products of pairs of co and cross measurements referred to is actually the complex product of the co-polar signal (received signal co-planar with transmitted signal), and the complex conjugate of the cross-polar signal (received signal orthogonal to transmitted signal).

The objective of the following analysis is to provide a mathematical illustration of the various propagation stages associated with space radar in order to outline its behaviour. The illustration takes as its example, a vertically polarised radar pulse. Nevertheless, the analysis would be equally valid for a horizontally polarised radar pulse.

The various propagation stages associated with space radar include:

emission of a radar signal pulse, passage through the ionosphere towards ground, interaction with and scattering of an echo signal from ground, passage of that echo signal through the ionosphere back towards the radar, reception of the echo signal at the radar antenna.

The Earth's atmosphere has no impact on Faraday Rotation and is therefore omitted from the analysis.

Assumptions and terminology horizontal axis of the space radar is parallel to the horizontal on the ground.

| | |
|---|---|
| the emitted radar signal | $\begin{pmatrix} vtx_v \\ vtx_h \end{pmatrix}$ |
| amplitude of emitted radar signal | $v_0$ |
| angle through which radar signal is rotated relative to vertical | $\psi$ |
| ground reflectivity | $\begin{pmatrix} S_{vv} & S_{vh} \\ S_{hv} & S_{hh} \end{pmatrix}$ |
| the rotation angle caused by Faraday Rotation | $\theta$ |
| signal arriving at ground | $\begin{pmatrix} vgnd_v \\ vgnd_h \end{pmatrix}$ |
| the echo signal scattered from the ground | $\begin{pmatrix} vscat_v \\ vscat_h \end{pmatrix}$ |
| the echo signal received at the radar receiver | $\begin{pmatrix} vrx_v \\ vrx_h \end{pmatrix}$ |
| estimated co cross signal after de-rotation of echo signal | $\begin{pmatrix} Vco_{(v)} \\ Vcross_{(h)} \end{pmatrix}$ |

The signal leaving antenna, pre-rotated through angle $-\psi$ is given by $$\begin{pmatrix} vtx_v \\ vtx_h \end{pmatrix} = \begin{pmatrix} \cos\psi & \sin\psi \\ -\sin\psi & \cos\psi \end{pmatrix} \begin{pmatrix} v_0 \\ 0 \end{pmatrix}$$

so that $$\begin{pmatrix} vtx_v \\ vtx_h \end{pmatrix} = v_0 \begin{pmatrix} \cos\psi \\ -\sin\psi \end{pmatrix}$$

The signal arriving at the ground after rotation through the ionosphere is given by;

$$(vg_v \quad vg_h) = \begin{pmatrix} \cos\theta & -\sin\theta \\ \sin\theta & \cos\theta \end{pmatrix} \begin{pmatrix} vtx_v \\ vtx_h \end{pmatrix}$$

which when expanded, takes the form;

$$\begin{pmatrix} vgnd_v \\ vgnd_h \end{pmatrix} = v_0 \begin{pmatrix} \cos(\theta - \psi) \\ \sin(\theta - \psi) \end{pmatrix}$$

The echo signal scattered from ground, at the ground, is given by;

$$\begin{pmatrix} vscat_v \\ vscat_h \end{pmatrix} = v_0 \begin{pmatrix} S_{vv} & S_{vh} \\ S_{hv} & S_{hh} \end{pmatrix} \begin{pmatrix} \cos(\theta - \psi) \\ \sin(\theta - \psi) \end{pmatrix}$$

which when expanded, takes the form;

$$\begin{pmatrix} vscat_v \\ vscat_h \end{pmatrix} = v_0 \begin{pmatrix} S_{vv}\cos(\theta - \psi) + S_{vh}\sin(\theta - \psi) \\ S_{hv}\cos(\theta - \psi) + S_{hh}\sin(\theta - \psi) \end{pmatrix}$$

The echo signal received at the radar antenna is given by;

$$\begin{pmatrix} vrx_v \\ vrx_h \end{pmatrix} = \begin{pmatrix} \cos\theta & -\sin\theta \\ \sin\theta & \cos\theta \end{pmatrix} \begin{pmatrix} vscat_v \\ vscat_h \end{pmatrix}$$

$$\begin{pmatrix} vrx_v \\ vrx_h \end{pmatrix} = v_0 \begin{pmatrix} \cos\theta & -\sin\theta \\ \sin\theta & \cos\theta \end{pmatrix} \begin{pmatrix} S_{vv}\cos(\theta - \psi) + S_{vh}\sin(\theta - \psi) \\ S_{hv}\cos(\theta - \psi) + S_{hh}\sin(\theta - \psi) \end{pmatrix}$$

$$\begin{pmatrix} vrx_v \\ vrx_h \end{pmatrix} = \frac{v_0}{2} \begin{pmatrix} S_{vv}2\cos(\theta - \psi)\cos\theta + S_{vh}2\sin(\theta - \psi)\cos\theta \\ -S_{hv}2\cos(\theta - \psi)\sin\theta - S_{hh}2\sin(\theta - \psi)\sin\theta \\ \\ S_{vv}2\cos(\theta - \psi)\sin\theta + S_{vh}2\sin(\theta - \psi)\sin\theta \\ +S_{hv}2\cos(\theta - \psi)\cos\theta + S_{hh}2\sin(\theta - \psi)\cos\theta \end{pmatrix}$$

which can be simplified to;

$$\begin{pmatrix} vrx_v \\ vrx_h \end{pmatrix} = \frac{v_0}{2} \begin{pmatrix} \begin{bmatrix} (S_{vv} + S_{hh})\cos(2\theta - \psi) + (S_{vv} - S_{hh})\cos\psi \\ -(S_{vh} + S_{hv})\sin\psi + (S_{vh} - S_{hv})\sin(2\theta - \psi) \end{bmatrix} \\ \begin{bmatrix} (S_{vv} + S_{hh})\sin(2\theta - \psi) + (S_{vv} - S_{hh})\sin\psi \\ +(S_{vh} + S_{hv})\cos\psi - (S_{vh} - S_{hv})\cos(2\theta - \psi) \end{bmatrix} \end{pmatrix}$$

The object of pre-rotation of the plane of polarisation at the transmitter was to ensure that the transmit signal arriving at the ground, and after rotation through the ionosphere, is polarised in a pure vertical (or horizontal) form. An identical rotation affects echoes from the ground as they pass through the ionosphere on their return path to the radar, so that these echoes arrive at the radar rotated through an angle $\theta$.

The task of transformation of the received echo signal into estimates of the co and cross forms that are scattered at the ground, becomes one of a simple de-rotation through angle $-\psi$ Thus, $$\begin{pmatrix} V_{co_{est}} \\ V_{cross_{est}} \end{pmatrix} = \begin{pmatrix} vrx_v \\ vrx_h \end{pmatrix} \begin{pmatrix} \cos\psi & \sin\psi \\ -\sin\psi & \cos\psi \end{pmatrix}$$

which becomes $$\begin{pmatrix} V_{co_{est}} \\ V_{cross_{est}} \end{pmatrix} =$$

$$\frac{v_0}{2} \begin{pmatrix} \cos\psi & \sin\psi \\ -\sin\psi & \cos\psi \end{pmatrix} \begin{pmatrix} \begin{bmatrix} (S_{vv} + S_{hh})\cos(2\theta - \psi) + (S_{vv} - S_{hh})\cos\psi \\ -(S_{vh} + S_{hv})\sin\psi + (S_{vh} - S_{hv})\sin(2\theta - \psi) \end{bmatrix} \\ \begin{bmatrix} (S_{vv} + S_{hh})\sin(2\theta - \psi) + (S_{vv} - S_{hh})\sin\psi \\ +(S_{vh} + S_{hv})\cos\psi - (S_{vh} - S_{hv})\cos(2\theta - \psi) \end{bmatrix} \end{pmatrix}$$

This expands to;

$$\begin{pmatrix} v_{co_{est}} \\ v_{cross_{est}} \end{pmatrix} = \frac{v_0}{2} \begin{Bmatrix} \begin{bmatrix} (S_{vv}+S_{hh})2\cos(2\theta-\psi)\cos\psi + (S_{vv}-S_{hh})2\cos^2\psi \\ -(S_{vh}+S_{hv})2\sin\psi\cos\psi + (S_{vh}-S_{hv})2\sin(2\theta-\psi)\cos\psi \\ (S_{vv}+S_{hh})2\sin(2\theta-\psi)\sin\psi + (S_{vv}-S_{hh})2\sin^2\psi \\ +(S_{vh}+S_{hv})2\sin\psi\cos\psi - (S_{vh}-S_{hv})2\sin\psi\cos(2\theta-\psi) \end{bmatrix} \\ \begin{bmatrix} -(S_{vv}+S_{hh})2\sin\psi\cos(2\theta-\psi) + (S_{vv}-S_{hh})2\sin\psi\cos\psi \\ +(S_{vh}+S_{hv})2\sin^2\psi + (S_{vh}-S_{hv})\sin(2\theta-\psi)\sin\psi \\ +(S_{vv}+S_{hh})2\sin(2\theta-\psi)\cos\psi + (S_{vv}-S_{hh})2\sin\psi\cos\psi \\ +(S_{vh}+S_{hv})2\cos^2\psi - (S_{vh}-S_{hv})2\cos(2\theta-\psi)\cos\psi \end{bmatrix} \end{Bmatrix}$$

and can be simplified to $$\begin{pmatrix} v_{co_{est}} \\ v_{cross_{est}} \end{pmatrix} = \frac{v_0}{2} \begin{pmatrix} [(S_{vv}-S_{hh}) + (S_{vv}+S_{hh})\cos(2\theta-2\psi) + (S_{vh}-S_{hv})\sin(2\theta-2\psi)] \\ [(S_{vh}+S_{hv}) - (S_{vh}-S_{hv})\cos(2\theta-2\psi) + (S_{vv}+S_{hh})\sin(2\theta-2\psi)] \end{pmatrix}$$

The test for success in estimation of the amount of Faraday Rotation being experienced is that $\langle v_{co}v^*_{cross}\rangle$ is equal to zero. This is estimated by formation of the term C where $$C = \sum_{j=1}^{N} \frac{(Vco_{est_j} Vcross^*_{est_j})}{N}$$

$$C = \sum_{j=1}^{N} \frac{(c_j)}{N}$$

The term $c_j$ can be written as follows, in terms of an error angle $\delta$ corresponding to the two actual rotations resulting from Faraday Rotation, $2\psi$, and the two counter rotations, $2\psi$, (pre-rotation of the transmitted signal by $\psi$ and de-rotation by $\psi$ of the received echo signals), implemented to correct for the effect;

$c_j = V_0^2 [S_{vv}(1+\cos \delta) - S_{hh}(1-\cos \delta) + (S_{vh}-S_{hv})\sin \delta]$.
$[(S^*_{vh}(1+\cos \delta) - S^*_{vh}(1-\cos \delta) + (S^*_{vv}+S^*_{hh})\sin \delta]$ which simplifies to $$c_j = v_0^2 \begin{Bmatrix} S_{vv}^2\left(\sin 2\delta + \frac{\sin 2\delta}{2}\right) \\ -S_{vv}^2\left(\sin\delta - \frac{\sin 2\delta}{2}\right) \\ +S_{vv}S_{hh}(\sin 2\delta) \\ +\text{many co. cross terms} \\ +S_{hv}S_{vh}(\sin 2\delta) \\ -S_{hv}^2\left(\sin\delta + \frac{\sin 2\delta}{2}\right) \\ +S_{vh}^2\left(\sin\delta - \frac{\sin 2\delta}{2}\right) \end{Bmatrix}$$

This expression can be further simplified as follows. When the term $C=1/N\Sigma c_j$ is formed, the contribution from co*cross terms is expected to approach zero.

For values of $\delta$ of smaller than 20 to 30°, the sine terms can be successfully approximated as follows $$\sin\delta - \frac{\sin 2\delta}{2} \to \frac{1}{2}\delta^3$$

$$\sin\delta + \frac{\sin 2\delta}{2} \to 2\sin\delta$$

$$\sin 2\delta \to 2\sin\delta$$

so that $c_j$ approximates to $c_j = 2 \sin \delta. [S_{vv}^2 - S_{hv}^2 + S_{vv}.S_{hh} + S_{hv}.S_{vh}]$ Of the terms included here, $S^2_{vv}$ is the dominant term, being typically 5 to 10 dB larger than $S^2_{hv}$ and $S_{hv}S_{vh}$. The term $S_{vv}S_{hh}$ is expected to be smaller than $S^2_{vv}$ but may be of similar order.

Thus, it can be seen that the C is given by;

$$C = \frac{2\sin\delta}{N} \sum_{j=1}^{N} (S_{vv}^2 - S_{hv}^2 + S_{vv}S^*_{hh} + S_{hv}S^*_{vh})$$

It can be seen that C moves steadily from +ve to −ve as $\delta$ changes, and has the characteristics necessary for inclusion as the control signal in a feedback loop whose function is to compensate for Faraday Rotation.

The de-rotated signals (through angle $\psi$) produced using the mathematical transformations described above, are used in the test for correlation between the co-polar and cross-polar channels. If the estimate of Faraday Rotation is correct, the correlation will be zero. If the estimate is too small, the product will be of one polarity, but if too large, the product will be of the other polarity. In the described embodiment, the angle of de-rotation is changed iteratively until the correlation is zero (or a minimum).

Of course, variations may be made without departing from the scope of the invention. Thus, if desired, only one polarisation of data may be transmitted along downlink 16. If desired, both planes of polarisation may be transmitted (intermittently) to establish the Faraday Rotation mathematically, before operation in one transmit plane resumes i.e. the invention is applicable to single and quadrature polarised radar, but is especially applicable to dual polarised radar. While in the described embodiment, Faraday Rotation is estimated from analysis of co-polarised and cross-polarised returns, Faraday Rotation could be estimated by any of the other methods described herein, for example, using ionospheric weather or other information 11.

The invention is not restricted to synthetic aperture radar, but applies to other types of radar e.g. scatterometry radar for measuring the scattering from the surface of the sea to estimate wind strength.

What is claimed is:

1. A radar, comprising: transmitter means for transmitting through the ionosphere pulses of radiation which are polarized in a plane; receiver means for receiving through the ionosphere radar returns scattered from the transmitted pulses; estimating means for making an estimate of a Faraday rotation undergone by the plane of polarization during transmission of the pulses through the ionosphere and during reception of the radar returns through the ionosphere; and means for adjusting the plane of polarization in dependence upon the estimate.

2. The radar as claimed in claim 1, in which the receiver means includes means for receiving the radar returns polarized in orthogonal planes.

3. The radar as claimed in claim 2, in which the estimating means includes means for analyzing the orthogonally polarized radar returns.

4. The radar as claimed in claim 3, in which the estimating means includes means for performing a correlation between the orthogonally polarized radar returns to establish a minimum therebetween.

5. The radar as claimed in claim 4, in which the estimating means includes means for calculating a complex multiplication of a product of one radar return of a pair of orthogonally polarized radar returns and a complex conjugate of the other radar return of the pair of orthogonally polarized radar returns, on a succession of samples.

6. The radar as claimed in claim 1, in which the estimating means includes means for considering ionospheric weather conditions.

7. The radar as claimed in claim 1, in which the estimating means includes means for considering total electron density within a plasma through which the transmitted pulses and the radar returns travel, and a magnitude of the Earth's magnetic field.

8. The radar as claimed in claim 1, in which the adjusting means includes means for mechanically moving an antenna of the transmitter means.

9. The radar as claimed in claim 1, in which the adjusting means includes means for electrically adjustably energizing an antenna of the transmitter means.

10. The radar as claimed in claim 1, and further comprising means for correcting the radar returns for the estimate.

11. The radar as claimed in claim 10, in which the correcting means includes means for mathematically processing the radar returns.

12. The radar as claimed in claim 1, in which the radar is a synthetic aperture radar.

* * * * *